UNITED STATES PATENT OFFICE.

JOHN FARNHAM BOYNTON, OF SYRACUSE, NEW YORK, ASSIGNOR TO CAROLINE H. BOYNTON.

CEMENT.

SPECIFICATION forming part of Letters Patent No. 448,632, dated March 24, 1891.

Application filed April 9, 1888. Serial No. 270,105. (No specimens.)

*To all whom it may concern:*

Be it known that I, JOHN FARNHAM BOYNTON, of the city of Syracuse, county of Onondaga, in the State of New York, have invented a new and useful Wall Plaster or Cement, of which the following is a full, clear, and exact specification.

In carrying out my invention I use ground quartz or finely-pulverized silex with common sand as the base of my composition. With this base I incorporate about an equal quantity of pulverized anhydrous selenite with ten per cent. of carbonate of lime, five per cent. of alumina, two per cent. of silicate of magnesia, one per cent. of amylaceous silicate of soda, and one-half per cent. of carbonate of magnesia, which are intimately commingled and form the cement or plaster. With this mass it is preferable, however, to mix ground straw of cereals or tissues of other plants rich in silex, cellulose, and amyloid substances for leavening and toughening the cement, thereby preventing it from too rapidly hardening after having been saturated with water and worked up as ordinary mortar.

I can make different grades of wall-plaster by varying the proportions of the ingredients above set forth, and I therefore do not restrict myself to the exact proportions; but these proportions are correct to all intents and purposes.

What I claim as new, and desire to secure by Letters Patent, is—

1. The herein-described compound, consisting of ground quartz or sand, pulverized silex, anhydrous selenite, lime carbonate, alumina, silicate of magnesia, amylaceous silicate of soda, and carbonate of magnesia.

2. The herein-described compound, consisting of ground quartz or sand, pulverized silex, anhydrous selenite, lime carbonate, alumina, silicate of magnesia, amylaceous silicate of soda, carbonate of magnesia, and ground tissues of plants containing silex, cellulose, and amyloid substances, substantially as set forth.

In testimony whereof I affix my signature in presence of two witnesses:

JOHN FARNHAM BOYNTON.

Witnesses:
JOHN W. TRUESDELL,
CHAS. C. TRUESDELL.